June 6, 1967 H. J. SHAFER 3,323,537
ROTARY VALVE OF WELDED TUBE AND PLATE CONSTRUCTION
AND METHOD OF MAKING
Filed Sept. 29, 1964 4 Sheets-Sheet 1

INVENTOR.
HOMER J. SHAFER
BY *Hamilton & Cook*
ATTORNEYS

INVENTOR.
HOMER J. SHAFER

June 6, 1967     H. J. SHAFER     3,323,537
ROTARY VALVE OF WELDED TUBE AND PLATE CONSTRUCTION
AND METHOD OF MAKING Filed Sept. 29, 1964     4 Sheets-Sheet 4

INVENTOR.
HOMER J. SHAFER
BY Hamilton & Cook
ATTORNEYS

United States Patent Office 3,323,537
Patented June 6, 1967

3,323,537
ROTARY VALVE OF WELDED TUBE AND PLATE CONSTRUCTION AND METHOD OF MAKING
Homer J. Shafer, 2300 Park Ave. W., Mansfield, Ohio 44906
Filed Sept. 29, 1964, Ser. No. 399,993
14 Claims. (Cl. 137—246.15)

The invention relates generally to rotary valves, especially those adapted for use in high pressure pipe lines, and more particularly valves of the ball valve type.

Ball valves are desirable for many reasons, e.g., they can be made to provide full, straight line flow through the valve in open position, and to provide complete shut-off with a quarter turn. However, the manufacture of the ball element, particularly for large size high pressure use, is a long, expensive task requiring utmost precision. The ball is usually cast in one piece and is extremely heavy. It requires laborious machining and grinding to form the accurately smooth spherical surfaces which rotate past and seat against the sealing rings located around the ports of the flow passage in the valve body. Large size heavy balls are difficult to handle and chuck during the machining and grinding operations.

Various modifications have been made which deviate from a true ball, but in all constructions of which I am aware, specially formed parts requiring precision machining and grinding of large spherical surface portions are required, these parts being in many instances joined to a cast core.

In my copending application Ser. No. 120,371, filed June 28, 1961, and allowed March 30, 1964 now Patent No. 3,155,368 I disclose a ball valve having a welded body with spherical surfaces cooperating with sealing rings mounted in a cast ball and insertable through the flow passages after the body is welded. Because the seal is effected between the sealing rings in the ball and the spherical surfaces on the body, the ball does not have to be machined spherically to such close tolerances as when the rings are in the body and seal against the ball, but nevertheless a very large part of the heavy ball has to be machined to a spherical configuration.

It is an object of the present invention to provide a novel rotary valve in which the valve element is a structure formed from a tube and plates welded together and requiring a minimum amount of machined spherical surfaces.

Another object is to provide a novel rotary valve element of reduced weight and maximum strength as compared to a solid cast ball.

Another object is to provide a novel rotary valve element which in closed position is structurally designed to transmit the line pressure to the trunnions journaling the element.

A further object is to provide a novel rotary valve element having a central preformed flow tube around which diametrically opposite sealing plates and diametrically opposite trunnion plates are structurally supported.

Another object is to provide a novel rotary valve structure having upstream seals in both directions, enabling bleeding off the body cavity between the seals to test the sealing ability of both seals at any time.

Another object is to provide a novel rotary valve element comprising a preformed central tube and plate construction which is easily assembled by using the tube as a gauge for positioning the plates and removing the tube while welding the plates together.

A still further object is to provide a novel rotary valve structure of preformed tube and plate construction having an improved sealing construction.

These and other objects are accomplished by the parts, constructions and method of assembly comprising the present invention, a preferred embodiment of which is shown by way of example in the accompanying drawings and described in the specification herein. Various modifications and changes in details of construction are embraced within the scope of the appended claims forming part hereof.

Referring to the drawings.

Figure 3:
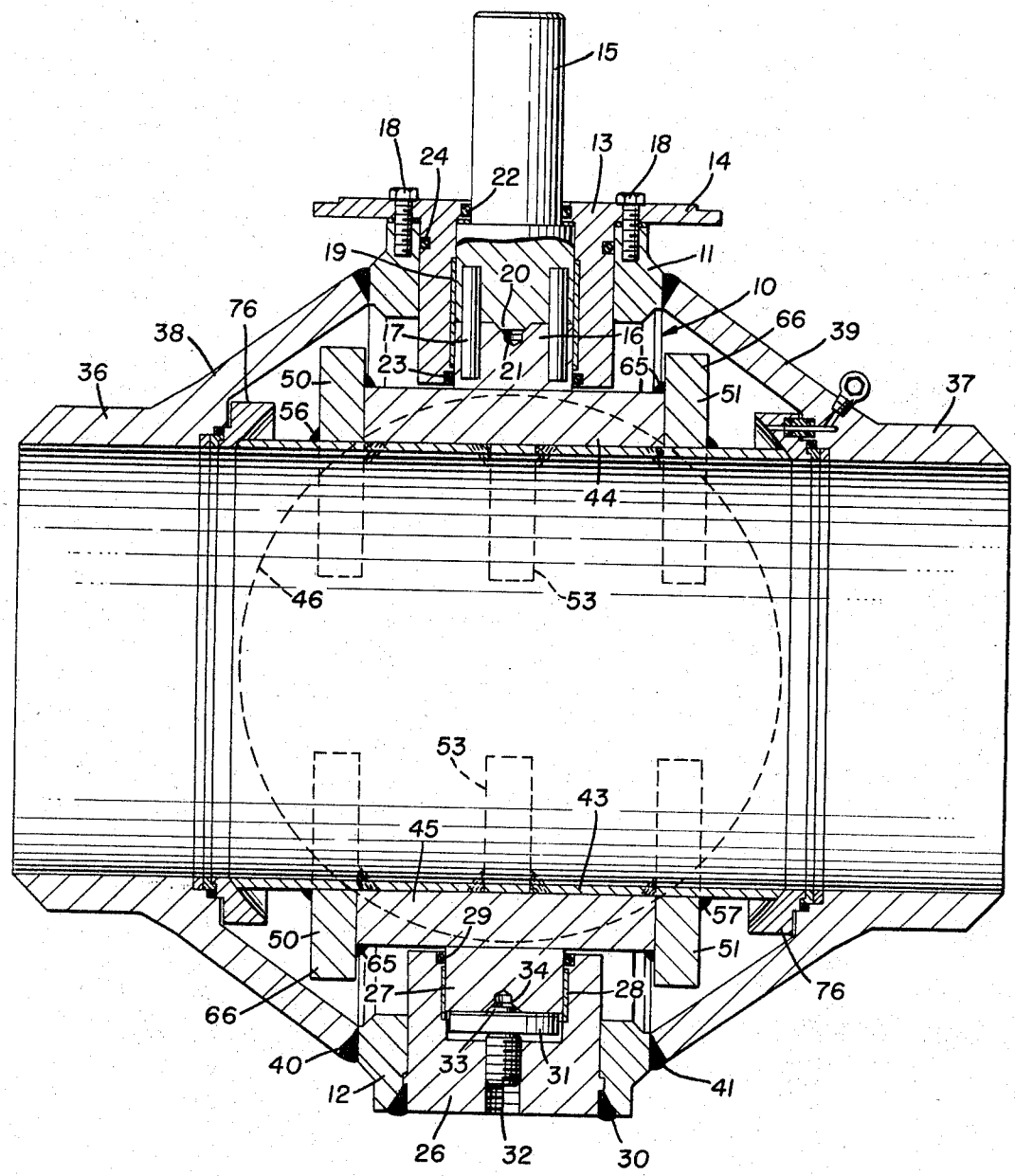
FIG. 3 is a vertical sectional view taken on the axis of the flow tube.
Figure 4:
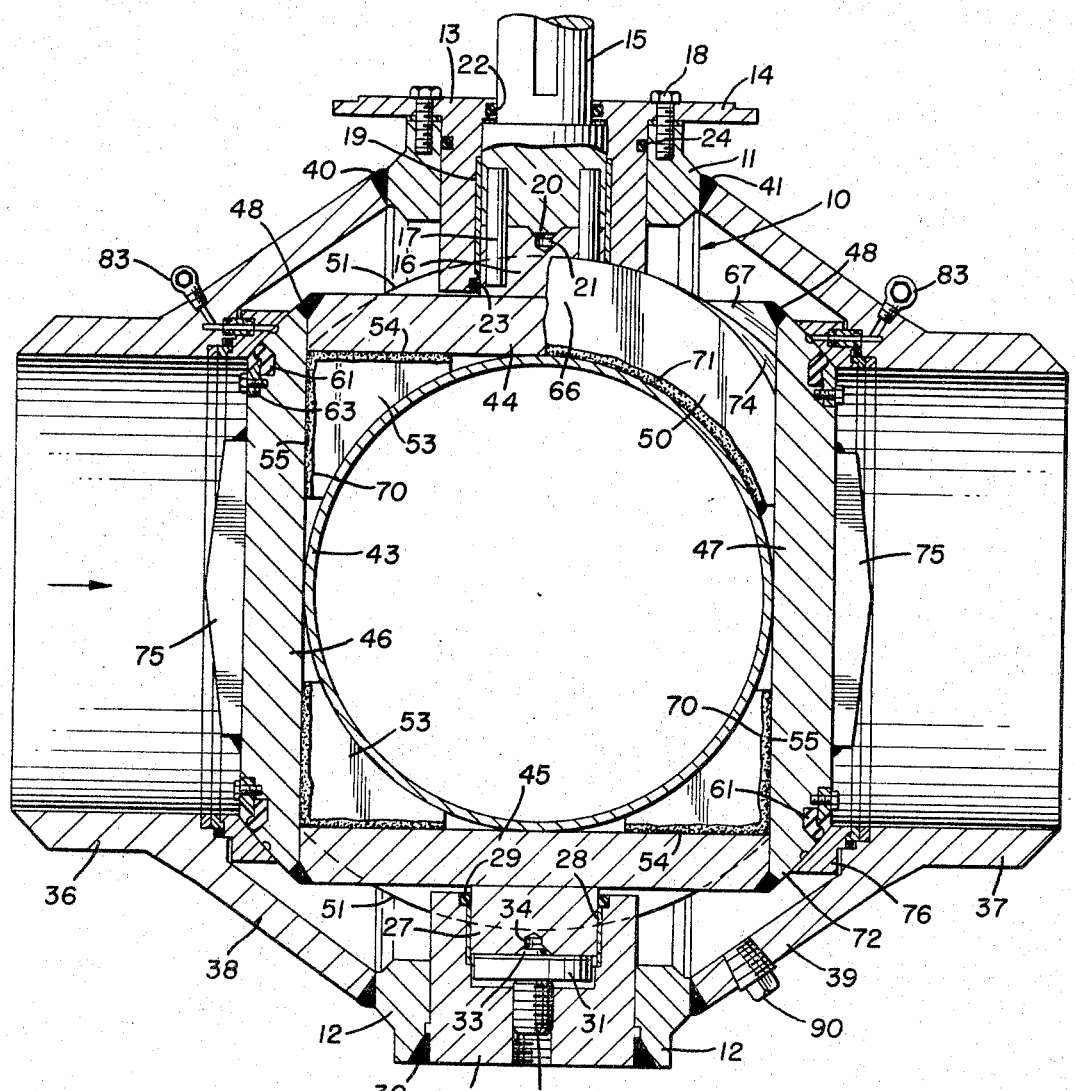
FIG. 4 is a transverse sectional view, with the valve in closed position.

The valve body in which the rotary valve element is rotatably mounted is shown in FIGS. 3 and 4, and is preferably constructed of preformed tubes welded together. The body has a central annular member indicated generally at 10, having diametrically opposite hollow bosses 11 and 12 in which the trunnion sleeves for journaling the rotary valve element are mounted.

An upper trunnion sleeve 13 is mounted in boss 11 and has an exterior annular mounting flange 14 for supporting a hydraulic motor (not shown) which rotates the valve stem 15 journaled in the trunnion sleeve and keyed to the trunnion 16 on the rotary valve element by pins 17 fitting in holes 25 in the trunnion. The trunnion sleeve 13 is preferably secured to boss 11 by screws 18. Preferably, a bushing 19 in trunnion sleeve 13 journals the lower part of the valve stem and the upper part of the trunnion 16 abutting the stem. As shown, the bottom surface of the stem may have a tapered projection 20 fitting into a tapered centering recess 21 in the upper surface of the trunnion 16. Suitable O-ring seals 22 and 23 are provided in the trunnion sleeve 13 around the valve stem and trunnion, respectively, and a seal 24 is mounted in the exterior of the sleeve within the boss 11.

A lower trunnion socket member 26 is mounted in the hollow boss 12 and journals the lower trunnion 27 projecting downwardly from the rotary valve element, there being preferably a bushing 28 in the socket journaling the trunnion, and an O-ring 29 in the upper part of the socket around the trunnion. The socket member may be secured in the boss 12 by an annular weld 30, and preferably has a thrust bearing plate 31 adjustably held against the bottom surface of trunnion 27 by a screw 32. The plate 31 may have a tapered projection 33 fitting in the centering recess 34 in trunnion 27.

The valve body also comprises flow tubes 36 and 37 having inner conical portions 38 and 39, respectively, which are joined to central tube 11 by annular welds 40 and 41. The outer ends of said tubes are shown beveled off for attachment to standard welding fittings, but may be provided with attaching flanges, if desired, for connection to attaching flanges on pipe fittings.

The valve body construction thus far described per se forms no part of the present invention.

The novel rotary valve element has a central flow tube 43 which is a piece of pipe or tubing having a length to fit within the flow tubes 38 and 39 of the assembled valve body, as shown in FIG. 3, with allowance for seating rings (to be described) interposed between the pipe and the cylindrical portions of the tubes 36 and 37 when the valve is in open position.

Figure 1:
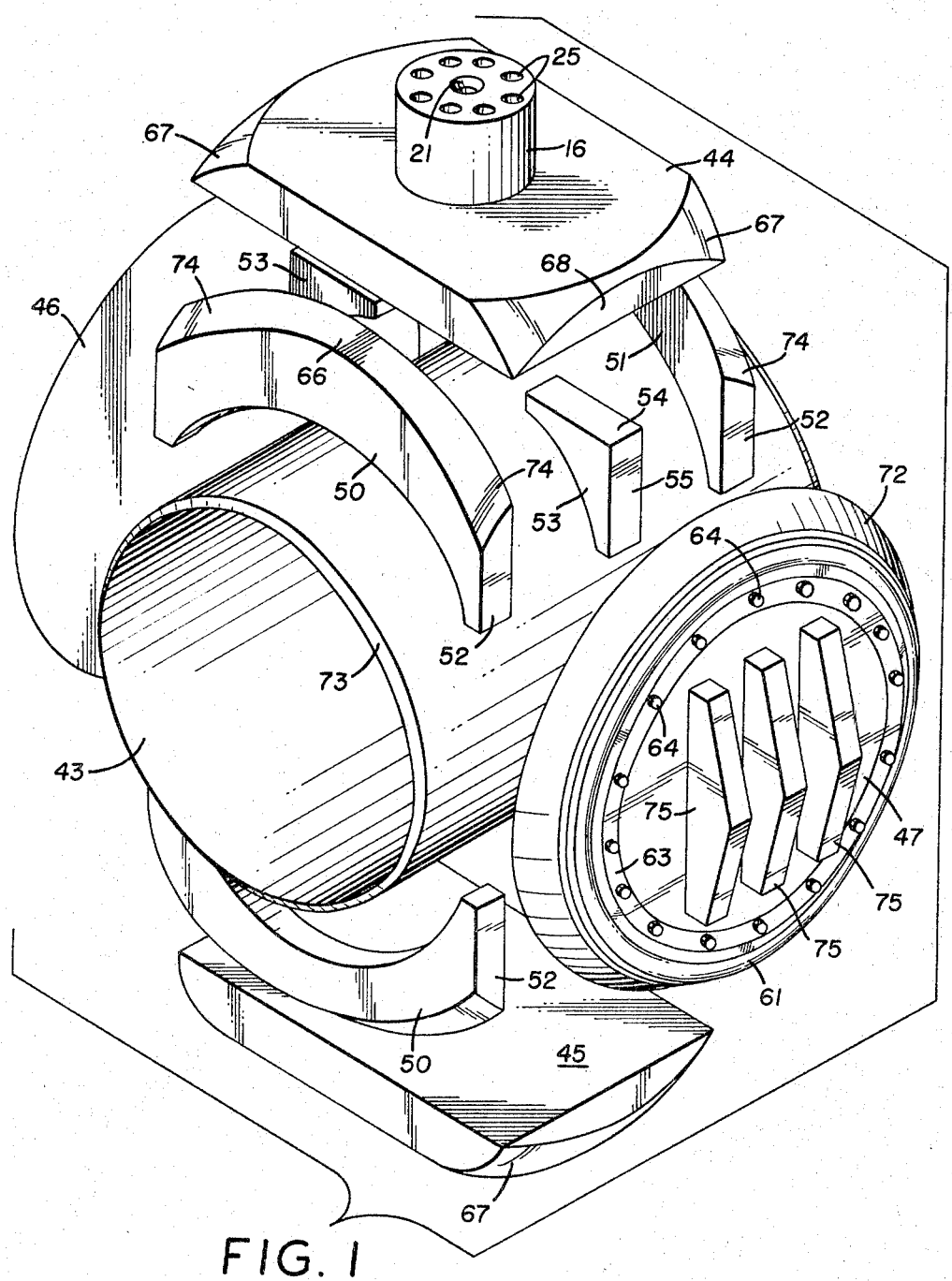
FIG. 1 is an exploded view in perspective of the novel rotary valve element, showing how the various plates are fitted around the central preformed flow tube.
Figure 2:
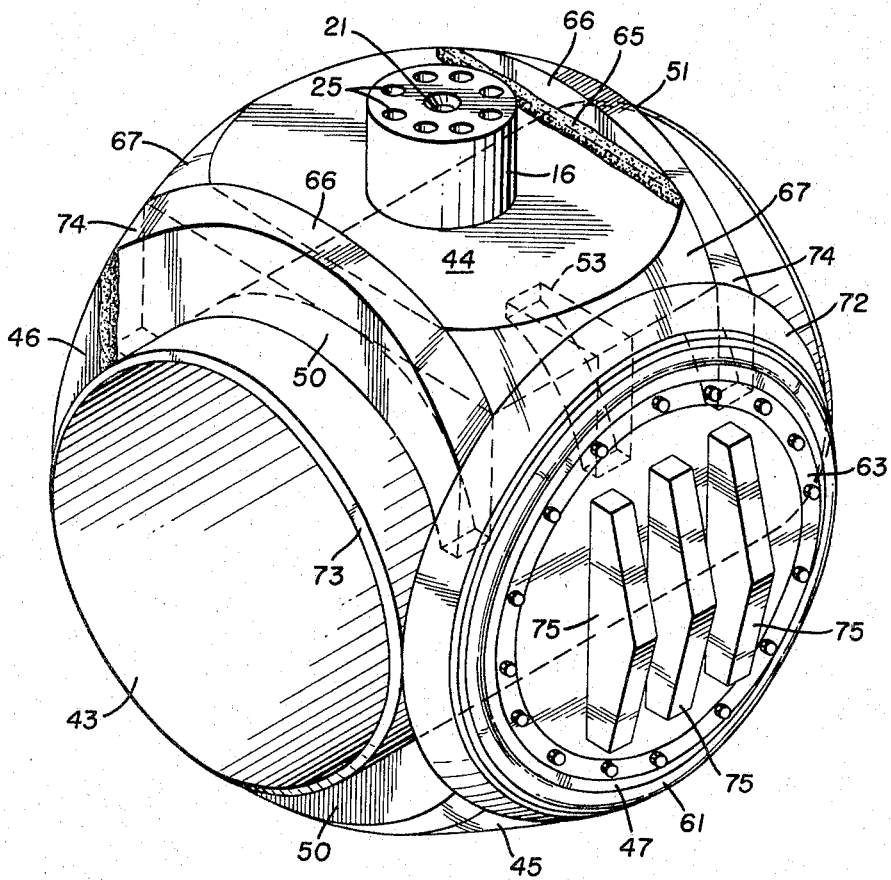
FIG. 2 is a perspective view of the assembled rotary valve element.

Referring particularly to FIGS. 1 and 2, the novel rotary valve element comprises diametrically opposite upper and lower trunnion plates 44 and 45 to which the trunnions 16 and 27, respectively, are attached, as by welding. The plates 44 and 45 are mounted tangentially to the tube 43 and 180° apart, as best shown in FIG. 4. At right angles to the plates 44 and 45 are two diametrically opposite sealing plates 46 and 47 mounted tangentially to the tube 43 and welded to the abutting edges of the trunnion plates as indicated at 48. Thus, the trunnion plates 44 and 45 and sealing plates 46 and 47 are rectangularly arranged around the tube 43 in tangential abutment therewith.

The trunnion plates 44 and 45 are the sealing plates 46 and 47 are structurally supported on and around the tube 43 by two pairs of upper and lower arcuate rib plates 50 and 51 spaced axially and extending transversely of the tube. The inner side surfaces of the upper rib plates 50 and 51 abut and are welded to the side edges of trunnion plate 44, and the lower rib plates 50 and 51 abut and are welded to the lower trunnion plate 45. The end faces 52 of the rib plates 50 and 51 are in planar abutment with the inner faces of the sealing plates 46 and 47 and are welded thereto.

Substantially midway between opposite ends of the ribs 50 and 51 are substantially triangular ribs 53 having their outer end faces 54 and 55 in welded abutment with the trunnion plates and sealing plates, respectively. The radially inner faces of the ribs 50, 51 and 53 are curved to conform to the outer surface of the central tube 43, and ribs 50 and 51 are welded thereto, as indicated at 56 and 57, respectively.

Figure 5:
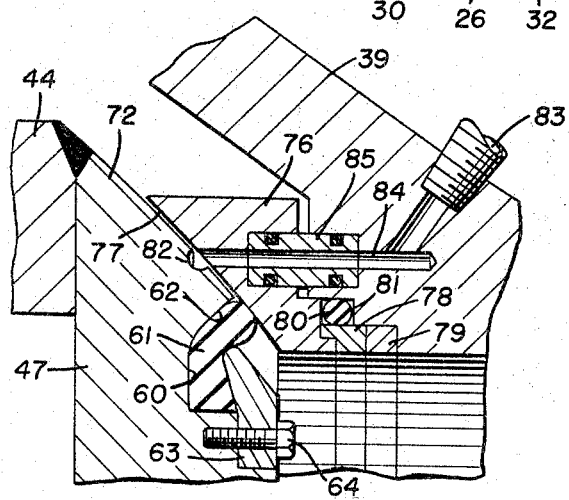
FIG. 5 is an enlarged fragmentary sectional view showing the improved sealing construction between the valve element and the valve body.

The sealing plates 46 and 47 have annular grooves 60 adjacent their outer peripheries for receiving resilient sealing rings 61, angular cross sectional shape of which is best shown in FIG. 5. The outer annular surface of the ring 61 abuts a shoulder 62, and the opposite surface is clamped by a retaining ring 63 below the rounded head of the sealing ring 61, so as to expose the inner side of the head. The retaining rings 63 may be attached to the sealing plates 46 and 47 by screws 64.

In assembling and fabricating the novel rotary valve element, the tube 43 is cut to predetermined length and used as a gauge around which to assemble the various plates making up the element. First the rib plates 50 and 51 are placed in position against the tube, and the trunnion plates 44 and 45 welded thereto, at 65, with the inner faces of ribs 50 and 51 abutting the opposite side edges of the trunnion plates, as indicated in the drawings. As seen in FIGS. 2 and 3 the central portions 66 of the ribs 50 and 51 project radially out beyond the trunnion plates, for a purpose to be described.

As shown in FIG. 1 the end edges of the trunnion plates may be arcuately beveled at 67 to approximate spherical surfaces, forming flat end surfaces 68 shaped like segments of circles for abutting the inner surfaces of the sealing plates 46 and 47. Next the sealing plates are placed in diametrically opposite positions with their flat inner surfaces in abutment with the end faces 52 of the ribs, and the plates are tacked welded to ribs 50 and 51 at accessible points.

The tubes 43 may now be withdrawn from the assembly, making accessible all edges of the end faces 52 of the ribs, and the plates 46 and 47 are then finished welded to the ribs around the abutting edges thereof. At this time the triangular plates 53 may be positioned midway between the ribs 50 and 51, and the faces 54 and 55 welded around their edges to the trunnion plates 44 and 45, and the sealing plates 46 and 47, respectively, as indicated at 70.

The tube 43 may now be reinserted in the assembly, the sealing plates and trunnion plates welded together along their edges at 48, and the outer side faces of the ribs 50 and 51 welded to the outer surface of the tube, as indicated at 71. The assembly is now ready to be machined so that all of the outer surfaces which pass over the seating rings are spherical, and the assembly is chucked in a machine on the trunnion centers 21 and 34 and machined by a cutting tool rotating on a radius about the center of the assembly.

During this operation the outer edges 72 of the sealing plates and the outer edges 73 of the tube 43 are machined to be spherical surfaces, as well as the end edges 67 of the trunnion plates. Also, the end portions 74 of the arcuate surfaces of ribs 50 and 51 are machined spherical to merge with the adjoining surfaces 67 and 72. Thus, the machining is greatly minimized because only the several disconnected edge portions require machining, as distinguished from the required machining of continuous surfaces on a solid ball. The central portions 66 of the ribs 50 and 51 are left to extend radially outwardly of the trunnion plates 44 and 45, as best shown in FIGS. 2 and 3, to give increased structural strength to the assembly. Thus, when the rotary element is subjected to high pressures in the closed position of FIG. 4, the ribs 50 and 51 act somewhat as columns under compression between the plates 46 and 47, serving to transmit pressure to the trunnions 16 and 27, and the extended central portions of the ribs provide increased cross-sectional strength.

The structural strength of the novel rotary element is equal in both directions so that upstream seals are provided at both sides of the element. Thus, the sealing ability of both seals can be tested at any time with the valve in a pipe line, by providing suitable bleed plug 90 in the body connecting with the body cavity around the ball, and removing the bleed valve with the rotary element in closed position under pressure.

As shown, the sealing plates 46 and 47 may have ribs 75 welded to their outer surfaces to increase their strength and resistance to high pressures when the rotary element is in closed position.

Referring to FIGS. 4 and 5, the seating rings 76 are interposed between the rotary element and the valve body, and have concave spherical surfaces 77 abutting the sealing rings 61. The rings 76 are held in place by retainer rings 78, backed up by spacer rings 79 fitting in grooves in the flow tubes 36 and 37. An O-ring seal 80 is preferably inserted between the ring 78 and an outer groove 81 in each flow tube.

Preferably, each of the sealing plates 46 and 47 is provided with lubricant groove 82 radially outward of the shoulder 62, to be used as a secondary or emergency seal if the sealing rings 61 become damaged. A suitable fitting 83 for injecting lubricant is tapped into each flow tube, and connects with a passageway 84 extending from the flow tube through the seating ring 76 to the groove 82. Between the flow tube and the seating ring 76, a sealing coupling 85 may be provided.

Assuming the flow to be in the direction of the arrow in FIG. 4, the pressure acting on the inner unsupported side of the upstream sealing ring 61 forces the ring against the abutting shoulder 62 to effect a tight seal between the ring 61 and the concave spherical surface 77 on the adjacent seating ring 76. On the downstream side, the relieved surface on retaining ring 63 allows the cavity pressure between the body and rotary element to vent to the downstream flow tube by bending the head of sealing ring 61 radially inward.

If lubricant is injected through fitting 83 on the downstream side, the pressure differential between the higher cavity pressure and the lower downstream pressure, plus the differential between the area of the seating ring exposed to cavity pressure and the area exposed to downstream pressure, acts to force the seating ring 76 toward the sealing plate 47 and maintain the seal between the two.

The novel rotary valve element of the present invention is formed entirely of a standard tube and plates welded together without requiring any parts to be cast, has maximum strength with reduced weight for use in high pressure lines, and is easily assembled with minimum machining requirements to provide efficient and durable seals in both directions adapted to be supplemented by lubricant seals. The novel element is structurally designed to transmit the line pressure from the sealing plates to the trunnions when the element is in closed position in a pipe line, and hence can withstand exceedingly high pressures.

What is claimed is:

1. A rotary valve having a welded body including flow tubes, a rotary valve element constructed of a central preformed flow tube having diametrically opposed sealing plates and diametrically opposite trunnion plates structurally supported on and welded to said flow tube, trunnions on said trunnion plates journaled in said body, said sealing plates having resilient ring seals mounted thereon and insertable through said body flow tubes, retaining means insertable through said body flow tubes for holding said ring seals in position, and seating rings interposed between said sealing rings and said body flow tubes for seating against said sealing rings.

2. A rotary valve having a welded body including flow tubes, a rotary valve element constructed of a central preformed flow tube having diametrically opposite sealing plates and diametrically opposed trunnion plates structurally supported on and welded to said flow tube, trunnions on said trunnion plates journaled in said body, said sealing plates having resilient ring seals mounted thereon and insertable through said body flow tubes, retaining means insertable through said body flow tubes for holding said ring seals in position, seating rings interposed between said sealing rings and said body flow tubes for seating against said sealing rings, lubricant grooves in said sealing plates radially outward of said resilient ring seals, and means in said body for injecting lubricant from the exterior of said body into said lubricant grooves.

3. A rotary valve element for a rotary valve, comprising a central preformed flow tube of predetermined length, diametrically opposed sealing plate and diametrically opposed trunnion plates rectangularly arranged around said tube in tangential abutment therewith, and arcuate ribs extending transversely between said sealing plates and welded to said tube, said arcuate ribs welded intermediate their ends to opposite sides of said trunnion plates and welded at their ends to said sealing plates.

4. A rotary valve element for a rotary valve, comprising a central preformed flow tube of predtermined length, diametrically opposite sealing plates and diametrically opposite trunnion plates rectangularly arranged around said tube in tangential abutment therewith, and arcuate ribs extending transversely between said sealing plates and welded to said tube, said arcuate ribs having central portions welded to opposite sides of said trunnion plates and extending radially outward therefrom, the ends of said ribs being welded to said sealing plates.

5. In a rotary valve having a body provided with aligned flow tubes, a rotary valve element comprising a central preformed flow tube of predetermined length, diametrically opposite sealing plates and diametrically opposite trunnion plates rectangularly arranged around said tube in tangential abutment therewith, trunnions on said trunnion plates journaled in said body, arcuate ribs extending transversely between said sealing plates and welded to said tube, said arcuate ribs welded intermediate their ends to opposite sides of said trunnion plates and welded at their ends to said sealing plates, resilient ring seals insertable through said body flow tubes, and retaining means insertable through said body flow tubes for mounting said ring seals on said sealing plates.

6. In a rotary valve having a body provided with aligned flow tubes, a rotary valve element comprising a central preformed flow tube of predetermined length, diametrically opposite sealing plates and diametrically opposite trunnion plates rectangularly arranged around said tube in tangential abutment therewith, trunnions on said trunnion plates journaled in said body, arcuate ribs extending transversely between said sealing plates and welded to said tube, said arcuate ribs welded intermediate their ends to opposite side of said trunnion plates and welded at their ends to said sealing plates, the intermediate portions of said ribs extending radially outward from said trunnion plates, resilient ring seals insertable through said body flow tubes, and retaining means insertable through said body flow tubes for mounting said ring seals on said sealing plates.

7. A rotary valve element for a rotary valve, comprising a central preformed flow tube of predetermined length, diametrically opposite sealing plates and trunnion plates rectangularly arranged around said tube in tangential abutment therewith, and axially spaced reinforcing ribs extending transversely between said sealing plates and welded to said tube, said ribs welded at their ends to said sealing plates and between their ends to opposite sides of said trunnion plates, the exterior edges of said sealing plates, trunnion plates and ribs being formed spherically about the center of said tube.

8. A rotary valve element for a rotary valve, comprising a central preformed flow tube of predetermined length, diametrically opposite sealing plates and trunnion plates rectangularly arranged around said tube in tangential abutment therewith, and axially spaced reinforcing ribs extending transversely between said sealing plates and welded to said tube, said ribs welded at their ends to said sealing plates and between their ends to opposite sides of said trunnion plates, the exterior edges of said sealing plates, trunnion plates and ribs being formed spherically about the center of said tube, and the central portions of said ribs extending radially outward from said trunnion plates.

9. The method of constructing a welded rotary valve element from a preformed tube and plates, comprising the steps of positioning axially spaced ribs around said tube and extending transversely thereof, positioning diametrically opposite trunnion plates between said ribs in tangential abutment with said tube, welding the sides of said ribs to opposite sides of said trunnion plates, positioning diametrically opposite sealing plates in tangential abutment with said tube and at right angles to said trunnion plates, tack welding said sealing plates to the ends of said ribs, removing said tube and completing the welding of said sealing plates around the ends of said ribs, reinserting said tube, and welding said ribs to said tube and said trunnion and sealing plates together along their edges.

10. The method of constructing a welded rotary valve element from a preformed tube and plates, comprising the steps of rectangularly arranging diametrically opposite trunnion plates and diametrically opposite sealing plates around said tube in tangential abutment therewith, positioning pairs of transversely extending ribs with their sides in abutment with opposite sides of said trunnion plates and their ends in abutment with said sealing plates, welding said ribs to said trunnion plates and tack welding the ends of said ribs to said sealing plates, removing said tube and completing the welding of said ribs to said sealing plates, reinserting said tube, and welding said ribs to said tube.

11. The method of constructing a welded rotary valve element from a preformed tube and plates, comprising the steps of positioning axially spaced ribs around said tube and extending transversely thereof, positioning diametrically opposite trunning plates between said ribs in tangential abutment with said tube, welding the sides of said ribs to opposite sides of said trunnion plates, positioning diametrically opposite sealing plates in tangential abutment with said tube and at right angles to said trunnion plates, and welding said ribs to said sealing plates and to said tube.

12. The method of constructing a welded rotary valve element from a preformed tube and plates, comprising the steps of rectangularly arranging diametrically opposite trunnion plates and diametricallly opposite sealing plates around said tube in tangential abutment therewith, positioning pairs of transversely extending ribs with their sides in abutment with opposite sides of said trunnion plates and their ends in abutment with said sealing plates, welding said ribs to said trunnion plates and welding said ribs to said sealing plates and to said tube.

13. In a rotary valve having a body provided with aligned flow tubes, a rotary valve element comprising a central preformed flow tube of predetermined length, diametrically opposite sealing plates and diametrically opposite trunnion plates rectangularly arranged around said tube in tangential abutment therewith, trunnions on said trunnion plates journaled in said body, arcuate ribs extending transversely between said sealing plates and welded to said tube, said arcuate ribs welded intermediate their ends to opposite sides of said trunnion plates and welded at their ends to said sealing plates, said ribs transmitting line pressure to said trunnions for providing upstream seals in both directions.

14. A rotary valve element for a rotary valve, comprising a central preformed flow tube of predetermined length, diametrically opposite sealing plates and trunnion plates rectangularly arranged around said tube in tangential abutment therewith, and axially spaced reinforcing ribs extending transversely between said sealing plates and welded to said tube, said ribs welded at their ends to said sealing plates, the exterior edges of said sealing plates, trunnion plates and ribs being formed spherically about the center of said tube.

References Cited
UNITED STATES PATENTS

| | | | |
|---|---|---|---|
| 3,155,368 | 10/1964 | Shafer | 251—315 |
| 3,246,873 | 4/1966 | Johnson | 251—315 |

WILLIAM F. O'DEA, *Primary Examiner.*

W. WRIGHT, *Assistant Examiner.*

UNITED STATES PATENT OFFICE
CERTIFICATE OF CORRECTION

Patent No. 3,323,537                      June 6, 1967

Homer J. Shafer

It is hereby certified that error appears in the above numbered patent requiring correction and that the said Letters Patent should read as corrected below.

Column 4, line 26, after "providing" insert -- a --; column 5, lines 8, 21 and 35, for "opposed", each occurrence, read -- opposite --; same line 35, for "plate" read -- plates --; line 36, for "opposed" read -- opposite --; line 75, for "side" read -- sides --.

Signed and sealed this 2nd day of July 1968.

(SEAL)
Attest:

Edward M. Fletcher, Jr.                   EDWARD J. BRENNER

Attesting Officer                       Commissioner of Patents